(12) United States Patent
Smith et al.

(10) Patent No.: US 9,146,684 B2
(45) Date of Patent: Sep. 29, 2015

(54) STORAGE ARCHITECTURE FOR SERVER FLASH AND STORAGE ARRAY OPERATION

(71) Applicant: NetApp, Inc., Sunnyvale, CA (US)

(72) Inventors: Hubbert Smith, Sandy, UT (US); Stephen Daniel, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 460 days.

(21) Appl. No.: 13/630,664

(22) Filed: Sep. 28, 2012

(65) Prior Publication Data

US 2014/0095758 A1    Apr. 3, 2014

(51) Int. Cl.
G06F 12/08 (2006.01)
G06F 3/06 (2006.01)

(52) U.S. Cl.
CPC ............ *G06F 3/0613* (2013.01); *G06F 3/0656* (2013.01); *G06F 3/0685* (2013.01); *G06F 12/0866* (2013.01)

(58) Field of Classification Search
CPC ......................... G06F 12/0804; G06F 12/0866
See application file for complete search history.

(56) References Cited

U.S. PATENT DOCUMENTS

| | | | |
|---|---|---|---|
| 5,819,292 A | 10/1998 | Hitz et al. | |
| 6,101,574 A | 8/2000 | Kumasawa et al. | |
| 7,010,553 B2 * | 3/2006 | Chen et al. | 1/1 |
| 7,203,796 B1 | 4/2007 | Muppalaneni et al. | |
| 7,249,150 B1 | 7/2007 | Watanabe et al. | |
| 7,330,862 B1 | 2/2008 | Srinivasan et al. | |
| 7,370,143 B1 | 5/2008 | Scott et al. | |
| 7,373,438 B1 | 5/2008 | DeBergalis et al. | |
| 7,376,866 B1 | 5/2008 | Sarma | |
| 7,783,606 B2 * | 8/2010 | Chang et al. | 707/657 |
| 8,069,366 B1 | 11/2011 | Wenzel | |
| 8,074,019 B2 | 12/2011 | Gupta et al. | |
| 8,145,838 B1 | 3/2012 | Miller et al. | |
| 8,286,029 B2 * | 10/2012 | Anderson et al. | 714/6.32 |
| 8,290,899 B2 * | 10/2012 | Webman et al. | 707/610 |
| 8,719,520 B1 * | 5/2014 | Piszczek et al. | 711/161 |

(Continued)

FOREIGN PATENT DOCUMENTS

WO    WO 2011/156466 A2    12/2011

OTHER PUBLICATIONS

PCT Notification of Transmittal of the International Search Report and the Written Opinion of the International Searching Authority, or the Declaration, International Searching Authority, International Application No. PCT/US2012/062544, mailed Apr. 5, 2013, 13 pages.

(Continued)

*Primary Examiner* — Brian Misiura
(74) *Attorney, Agent, or Firm* — Cesari and McKenna, LLP (57) ABSTRACT

A storage architecture of a storage system environment has a storage connector interface configured to exchange data directly between flash storage devices on a server and a storage array of the environment so as to bypass main memory and a system bus of the server. According to one or more embodiments, the storage connnector interface includes control logic configured to implement the data exchange in accordance with one of a plurality of operational modes that deploy and synchronize the data on the flash storage devices and the storage array. Advantageously, the storage connector interface obviates latencies and bandwidth consumption associated with prior data exchanges over the main memory and bus, thereby enhancing storage architecture performance.

20 Claims, 4 Drawing Sheets

(56) References Cited

U.S. PATENT DOCUMENTS

| | | | |
|---|---|---|---|
| 8,805,949 B2 * | 8/2014 | Aviles et al. | 709/213 |
| 8,806,115 B1 * | 8/2014 | Patel et al. | 711/103 |
| 8,898,388 B1 * | 11/2014 | Kimmel | 711/114 |
| 2008/0243952 A1 * | 10/2008 | Webman et al. | 707/204 |
| 2009/0182836 A1 | 7/2009 | Aviles et al. | |
| 2011/0047437 A1 | 2/2011 | Flynn | |
| 2011/0276746 A1 | 11/2011 | Pruthi et al. | |
| 2013/0042066 A1 * | 2/2013 | Price | 711/119 |

OTHER PUBLICATIONS

EMULEX White Paper—Boosting Hadoop Performance with Emulex OneConnect 10GbE Network Adapters, http://www.emulex-dell.com/artifacts/...9f0b.../elx_wp_all_oc_hadoop.pd,f pp. 1-15, 2012.

Fusion-IO White Paper—"Fusion-io: A New Standard for Enterprise-class Reliability" http://www.fusionio.com/white-papers/fusion-io-a-new-standard-for-enterprise-class-reliability/, 3 pages, 2012.

\* cited by examiner

STORAGE ARCHITECTURE FOR SERVER FLASH AND STORAGE ARRAY OPERATION

BACKGROUND

1. Technical Field

The present disclosure relates to storage system environments and, more specifically, to a storage architecture of a storage system environment.

2. Background Information

A storage system environment may include a server configured to provide storage service relating to the organization of data on a storage array of writable persistent storage media, such as disks. The storage system environment may employ a storage architecture that enables the server to serve the data from the storage array in file system and block formats with high reliability and integrity through the use of data protection and management techniques, such as tiered storage, persistent point-in-time read-only images of the data, and/or Redundant Array of Independent (or Inexpensive) Disks (RAID) implementations. However, access to the data stored on the disks may require the server to perform frequent input/output (I/O) operations over one or more internal system buses to the storage array, which could adversely impact performance of the storage architecture.

Prior attempts to improve performance of the storage architecture included the use of solid-state storage media, such as flash storage devices, to serve data stored on the server. Although the use of such storage may improve the access performance to the data, flash devices generally have limited storage capacity and a high cost per terabyte of storage (compared to disks). In addition, the flash devices generally have no credible capability to protect and/or manage the data at large scale. Accordingly, protection of data stored on the server flash storage is often realized through techniques such as server replication, i.e., replication of the data among a plurality of servers. Yet, server replication may also require frequent data exchanges between the flash devices and main memory of the server over one or more system buses, resulting in large amounts of data traffic over the buses prior to forwarding of the traffic to the other servers. Such data traffic typically consumes large amounts of memory bandwidth, thereby adversely impacting performance of the storage architecture.

SUMMARY

Embodiments described herein provide a storage architecture of a storage system environment having a storage connector interface configured to exchange data directly between flash storage devices on a server and a storage array of the environment so as to bypass main memory and a system bus of the server. The storage connector interface illustratively includes control logic configured to implement the data exchange in accordance with one of a plurality of operational modes that deploy and synchronize the data stored on the flash storage devices and the storage array. Advantageously, the storage connector interface obviates latencies and bandwidth consumption associated with prior data exchanges over the main memory and bus, thereby enhancing storage architecture performance.

In an embodiment, the storage connector interface is illustratively contained on a storage connector adapter that also includes the flash storage devices coupled to an input/output (I/O) journal. The I/O journal may be configured to temporarily record ("log") one or more write operations received from an application executing on the server to process (e.g., modify) data stored on the flash storage devices. Specifically, the I/O journal may be configured to cooperate with the storage connector interface to log the write operation in accordance with an ordering constraint used to implement the operational mode, thereby providing a consistent recovery point for the data in the event of a failure that interrupts deployment and synchronization of the data. To that end, the I/O journal may be further configured to provide a last-state retention capability that logs a current state of the data with respect to storage on the flash devices and/or storage array, and that further enables (re)processing of the logged write operation in the event of the failure.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
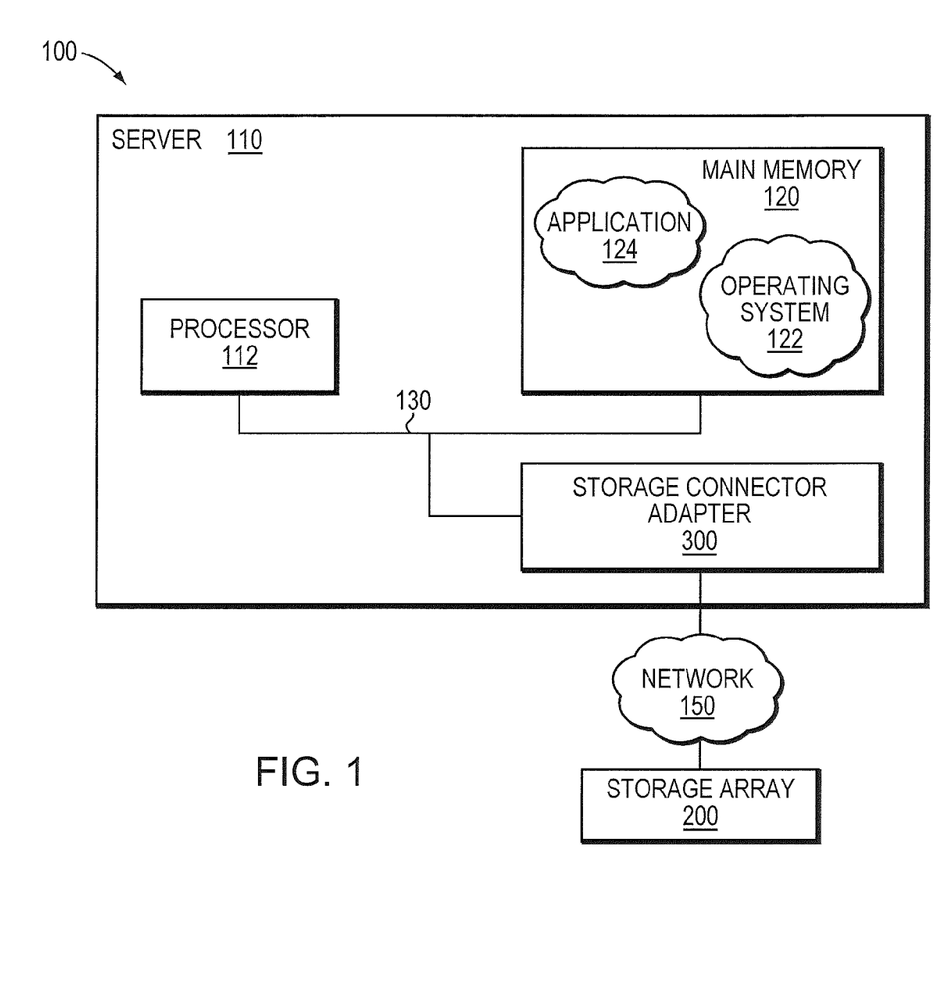
FIG. 1 is a block diagram of a storage system environment including a server coupled to a storage array.

FIG. 1 is a block diagram of a storage system environment 100 that may be advantageously used with one or more embodiments described herein. The storage system environment 100 includes a storage architecture that enables efficient processing of subsets of large data sets in the context of, e.g., in-memory analytics and/or real-time analytics. To that end, the storage system environment may include a server 110 illustratively interconnected with a storage array 200 via a network 150, e.g., a point-to-point link, shared local area network, wide area network or virtual private network implemented over a public network, such as the well-known Internet. Illustratively, the server 110 may be configured to reliably perform analytic tasks (e.g., similar to database queries) on subsets of data retrieved from the large data sets (e.g., petabyte to multi-petabyte data sets) stored on the storage array 200.

In one or more embodiments, the server 110 may include a processor 112, a main memory 120 and a storage connector adapter 300 interconnected by a system bus 130. The main memory 120 may comprise storage locations that are addressable by the processor 112 and adapter 300 for storing software programs and data structures associated with the embodiments described herein. The processor and adapter may, in turn, comprise processing elements and/or logic circuitry configured to execute the software programs and manipulate the data structures. An operating system 122, portions of which are typically resident in main memory and executed by the processing elements, functionally organizes the server by, inter alia, invoking operations in support of one or more applications 124 (e.g., a table-oriented database application) executing on the server. A suitable operating system 122 may include the UNIX® series of operating systems and the Microsoft Windows® series of operating systems; however, in an embodiment described herein, the operating system is illustratively the Linux® operating system. It will be apparent to those skilled in the art that other processing and memory means, including various computer readable media, may be used to store and execute program instructions pertaining to the embodiments herein.

The storage connector adapter 300 comprises the mechanical, electrical and signaling circuitry needed to connect the server 110 to the storage array 200 over network 150. As described herein, the storage connector adapter 300 may interact with the storage array 200 to exchange data in accordance with a plurality of operational modes that deploy and synchronize the data stored on the server with the data stored on the storage array. Accordingly, the storage connector adapter 300 may include control logic configured to generate and issue packets including file-based access protocols, such as the Common Internet File System (CIFS) protocol or Network File System (NFS) protocol, over the Transmission Control Protocol/Internet Protocol (TCP/IP) when exchanging data in the form of files with the storage array 200. Alternatively, the adapter may issue packets including block-based access protocols, such as the Small Computer Systems Interface (SCSI) protocol encapsulated over TCP (iSCSI), serial attached SCSI (SAS), and SCSI encapsulated over Fibre Channel (FC), when exchanging data in the form of logical units (LUNs).

Figure 2:
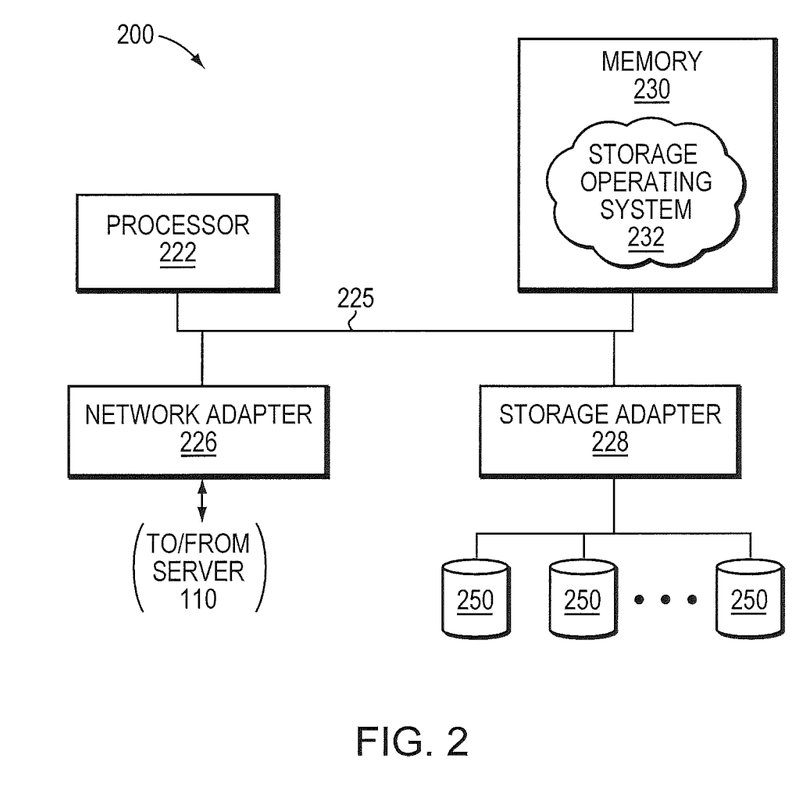
FIG. 2 is a block diagram of the storage array.

FIG. 2 is a block diagram of storage array 200 that may be advantageously used with one or more embodiments described herein. The storage array 200 may be a computer coupled to a plurality of disks 250 and having features such as simplicity of storage service management and ease of storage reconfiguration, including reusable storage space, for users such as server 110. In addition, the storage array 200 may be configured to interact with the server 110 to enable service of data, e.g., stored on the disks 250 or other similar media adapted to store data, in file system and block formats with high reliability and integrity through the use of data protection and management techniques, such as tiered storage, persistent point-in-time read-only images of the data, and/or Redundant Array of Independent (or Inexpensive) Disks (RAID) implementations.

In an embodiment, the storage array 200 is illustratively embodied as a storage system comprising a processor 222, a memory 230, one or more network adapters 226 and a storage adapter 228 interconnected by a bus 225. Each network adapter 226 includes circuitry needed to connect the server 110 to the storage array 200 over network 150. The storage array 200 also includes a storage operating system 232 that provides a virtualization system (and, in particular, a file system) to logically organize the data as a hierarchical structure of named directory, file and LUN storage objects on disks 250. The file system may be configured to provide volume management capabilities for use in block-based access to the data stored on disks 250. These capabilities include (i) aggregation of the disks, (ii) aggregation of storage bandwidth of the disks, and (iii) reliability guarantees, such as synchronous mirroring and/or parity (RAID).

The file system also has the capability to generate a persistent point-in-time read-only image or "snapshot" of data stored on the disks 250. The snapshot is a space conservative, point-in-time read-only image of data that provides a consistent image of the data at some previous time. More particularly, a snapshot is a point-in-time representation of a storage element, such as an active file system, file or database, stored on a storage device (e.g., on disk) or other persistent memory and having a name or other identifier that distinguishes it from other snapshots taken at other points in time. A snapshot can also include other information (metadata) about the active file system at the particular point in time for which the image is taken.

Storage of data on the storage array 200 may be implemented as one or more storage volumes that comprise a cluster of the disks 250, defining an overall logical arrangement of disk space. The disks within a volume are typically organized as one or more RAID groups. RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

The storage adapter 228 may cooperate with the storage operating system 232 to access (e.g., store via a write operation or retrieve via a read operation) data requested by the server 110. The storage adapter may include I/O interface circuitry that couples to the disks over an I/O interconnect arrangement, such as a conventional high-performance, FC serial link topology. The data may be stored on disk 250 by the storage adapter and, upon completion, an acknowledgement may be generated by the processor 222 (or the adapter 228) prior to being forwarded over the bus 225 to the network adapter 226, where the acknowledgement is formatted into one or more packets and forwarded to the storage connector adapter 300 of server 110.

Figure 3:
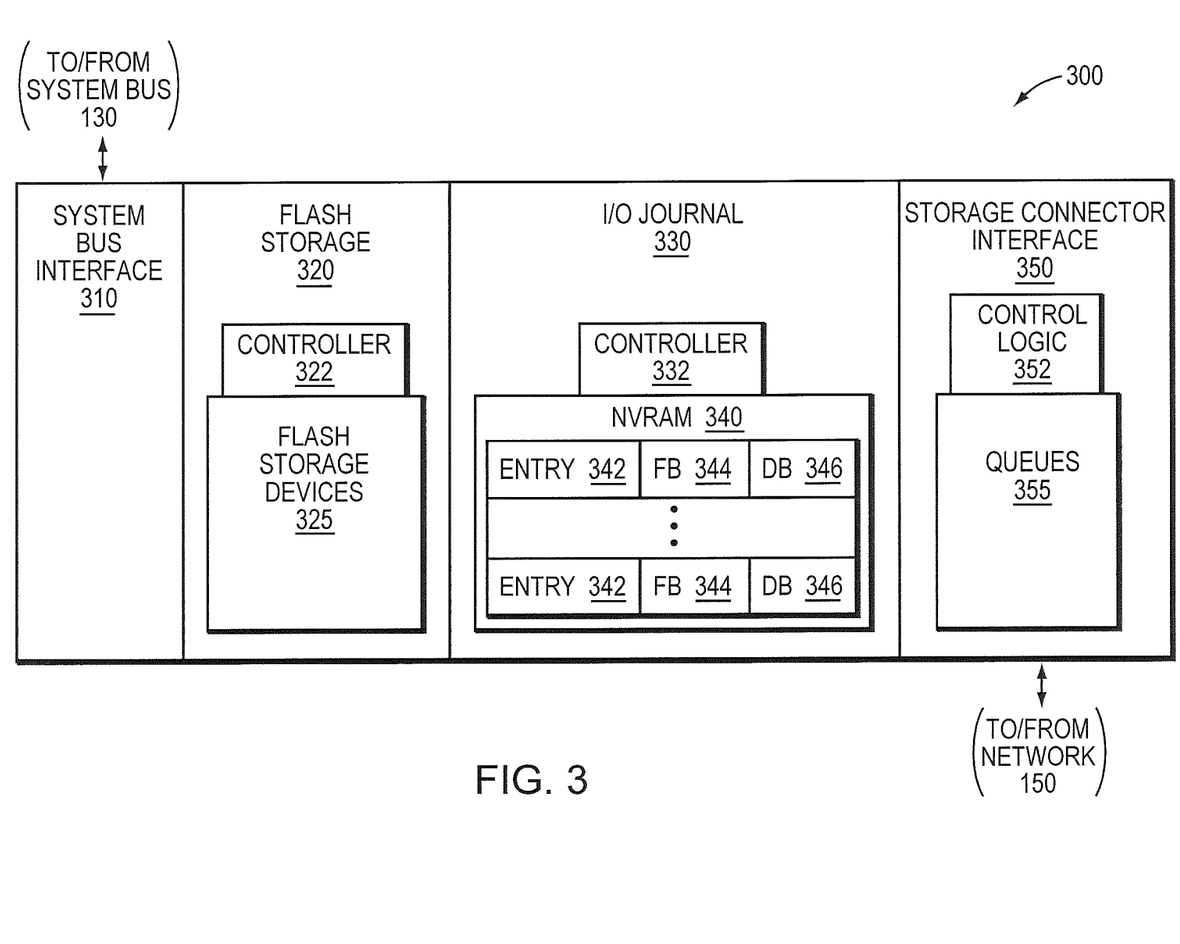
FIG. 3 is a block diagram of a storage connector adapter of the server.

FIG. 3 is a block diagram of storage connector adapter 300 that may be advantageously used with one or more embodiments described herein. The storage connector adapter 300 may include a system bus interface 310, flash storage 320, an input/output (I/O) journal 330 and a storage connector interface 350. The system bus interface 310 includes the mechanical, electrical and signaling circuitry needed to connect the adapter 300 to the system bus 130. The flash storage 320 includes a controller 322 configured to control, e.g., read and/or write access to data stored on an array of non-volatile flash storage devices 325. In an embodiment, the flash storage devices are illustratively block-oriented NAND devices, although it will be understood to those skilled in the art that other block-oriented, non-volatile, solid-state electronic devices may be advantageously used with the embodiments described herein.

The I/O journal 330 includes a controller 332 configured to control access to electronic storage that may be embodied as a portion of the flash storage devices 325 organized as, e.g., a circular buffer. In an embodiment, though, the electronic storage of the I/O journal 330 may be embodied as solid-state, non-volatile random access memory (NVRAM 340) having a plurality of entries 342. The NVRAM 340 may also include either a back-up battery or other built-in last-state retention capability (e.g., non-volatile semiconductor memory) that is capable of maintaining data in light of a failure to the server and storage system environment. As a result, the NVRAM 340 of the I/O journal 330 may be configured to temporarily record ("log") one or more write operations received from application 124 executing on the server 110 to process (e.g., modify) data stored on the flash storage devices 325.

According to one or more embodiments, the storage architecture of the storage system environment 100 may be enhanced through a storage connector interface 350 configured to exchange (e.g., forward) data directly between the flash storage devices 325 and the storage array 200 so as to bypass main memory 120 and system bus 130 of server 110. In an embodiment, the storage connector interface 350 includes control logic 352 configured to implement the data exchange in accordance with one of a plurality of operational modes that deploy and synchronize the data stored on the flash storage devices 325 and the storage array 200. The storage connector interface 350 may also include a plurality of queues 355 configured and arranged to enforce one or more ordering constraints used to implement the operational modes, as described herein.

In an embodiment, the I/O journal 330 may be configured to cooperate with the storage connector interface 350 to log a write operation issued by application 124 in accordance with the ordering constraint used to implement the operational mode, thereby providing a consistent recovery point for the data in the event of a failure that interrupts deployment and synchronization of the data on the flash storage devices 325 and storage array 200. To that end, the last-state retention capability of the I/O journal 330 may enable logging of a current state of the data with respect to storage on the flash devices and/or storage array to thus further enable (re)processing of the logged write operation in the event of the failure. As described herein, the operational modes illustratively include a synchronous mirroring mode (Mode A), a journaled, forced ordering mode (Mode B), a journaled, partial ordering mode (Mode C), and an out-of-order mode (Mode D).

According to Mode A, a write operation (request) for a data set (data) may be issued by application 124 and logged as an entry 342 in the NVRAM 340 by the I/O journal controller 332. The write request may be processed by the processor 112 to, e.g., modify the data for storage on the flash storage devices 325. In response, the I/O journal controller 332 may assert a flash bit ("FB") 344 associated with the logged entry 342 indicating successful storage of the modified data on the flash storage devices 325. Concurrently, the write request may be passed to the storage connector interface 350 where it is temporarily stored on one or more queues 355 prior to being forwarded (i.e., synchronously mirrored) as one or more packets to the storage array 200. The control logic 352 of the storage connector interface 350 may cooperate with the I/O journal controller 332 to assert a dirty bit ("DB") 346 associated with the logged entry 342. In an embodiment, the DB 346 indicates that the write request of the entry is "dirty" (not completely processed) pending acknowledgement of storage on the array. Thus, in the event of a failure to the storage system environment 100 prior to completion of storage of the mirrored data on the storage array 200, the write request can be replayed, e.g., (re)processed, from the logged entry in the I/O journal. Upon receiving an acknowledgement indicating completion of the write request at the storage array 200, the storage connector interface 350 forwards the acknowledgement to the I/O journal controller 332, which de-asserts the DB 346 indicating completion of the synchronous write request and notifies (e.g., via an application programming interface (API) acknowledgement) the application 124 of the completion.

In essence, Mode A enforces order by instituting synchronous mirroring on a per write request basis; that is, as each write request is issued by application 124, it is synchronously forwarded to the storage array 200. However, the write request is not considered completed until the modified data is stored on both flash storage 320 and the storage array 200. Mode A is thus the safest of the operational modes that provides fast read access to the data without accelerating write requests. Accordingly, this synchronous mode of operation may be used in banking transactions, stock trading, online transaction processing applications and other deployments where synchronous mirroring of data (e.g., to a persistent storage array) is mandatory.

In an embodiment, Mode A may be extended to further enforce ordering on a multiple write (i.e., batch) request basis. Assume that while waiting for acknowledgement of completion a synchronous write request from the storage array, multiple write requests are issued by application 124. These write requests may be processed and temporarily stored on the queues 355 (as described above) waiting for the acknowledgement. Upon receiving the acknowledgement, the queued write requests are then forwarded to the storage array 200 as a first synchronous batch request. While waiting for acknowledgement of the first synchronous batch request, a second batch of requests may be issued, processed and temporarily stored on the queues. As long as the second batch of requests is not forwarded to the storage array until completion of the first synchronous batch request is acknowledged by the array, this embodiment of Mode A may provide substantial performance improvement.

According to Mode B, a write request for data may be issued by application 124 and logged as entry 342 in the NVRAM 340 by the I/O journal controller 332 prior to modification of the data by the processor 112 for storage on the flash storage devices 325. Upon successful storage on the devices 325, the I/O journal controller 332 may assert the FB 344 associated with the logged entry 342 and notify the application 124 of completion (e.g., via the API acknowledgement) of the write request. The write request may be passed to the storage connector interface 350 where it is temporarily stored on one or more queues 355 to enable enforcement of the forced ordering constraint. Specifically, the control logic 352 of the storage connector interface 350 may forward the write request to the storage array 200 as soon as possible, subject to the constraint that it be ordered with respect to other write requests issued by application 124. Thus unlike Mode A, Mode B does not require acknowledgement of storage of the modified data on the storage array 200 before completion of the write request is acknowledged. However, all write requests processed in accordance with the forced ordering constraint of Mode B are assumed (e.g., by application 124) to be fully ordered and dependent.

Implementation of Mode C is generally similar to Mode B, except that acknowledgement of write request completion to application 124 may be delayed by a short, but adjustable, period of time (e.g., 1 millisecond). Here, a write request for data may be issued by application 124 and logged as entry 342 in the NVRAM 340 by the I/O journal controller 332 prior to modification of the data by the processor 112 for storage on the flash storage devices 325. Upon successful storage on the devices 325, the I/O journal controller 332 may assert the FB 344 associated with the logged entry 342 and delay notification of completion of the write request to application 124 for the adjustable period of time. The write request may be passed to the storage connector interface 350 where it is temporarily stored on one or more queues 355 to enable enforcement of the partial ordering constraint.

Notably, the adjustable delay allows additional write requests issued by application 124 to be aggregated during this period of time before forwarding by the storage connector interface 350 as one or more packets to the storage array 200. Any additional write requests received during the period of time may be known (e.g., by application 124) to be independent. In an embodiment, the control logic 352 may cooperate with the I/O journal controller 332 to enforce the partial ordering constraint via implementation of a queuing algorithm that considers, inter alia, the number of aggregated write requests before forwarding the aggregation to the storage array. Such cooperation further enables the I/O journal controller 332 to record a set of partially ordered write requests. In another embodiment, the independent write requests may be forwarded by the storage connector interface 350 to the storage array 200 concurrently to thereby increase throughput.

Implementation of Mode D is generally similar to Mode C, except that write requests may be forwarded to the storage array 200 concurrently without order, i.e., out-of-order. Here, a write request for data may be issued by application 124 and logged as entry 342 in the NVRAM 340 by the I/O journal controller 332 prior to modification of the data by the processor 112 for storage on the flash storage devices 325. Upon successful storage on the devices 325, the I/O journal controller 332 may assert the FB 344 associated with the logged entry 342 and delay notification of completion of the write request to application 124 for the adjustable period of time so as to enable aggregation of additional write requests. The write requests may be passed to the storage connector interface 350 where they are temporarily stored on one or more queues 355 prior to forwarding (without order) to the storage array 200. Once the out-of-order requests are forwarded to the storage array, the operational mode may temporarily shift to Mode A and wait for acknowledgement (of completion of storage) of the out-of-order requests on the storage array. The control logic 352 of the storage connector interface 350 may then request that the storage array 200 perform a snapshot of the data stored on the disks 250, thereby establishing a consistent recovery point in the event of a failure. Subsequently, the operational mode may revert back to Mode D.

Advantageously, the storage connector interface 350 obviates latencies and bandwidth consumption associated with prior data exchanges over the main memory 120 and system bus 130, thereby enhancing performance of the storage architecture. In addition, cooperation between the storage connector interface 350 and I/O journal 330 enables implementation of the operational modes with ordering constraints to thereby provide one or more consistent recovery points for the data in the event of a failure that interrupts deployment and synchronization of the data between the flash storage devices 325 and storage array 200.

According to one or more embodiments, failure of the storage system environment 100 may result from, e.g., an unexpected loss of power to the server 110 or storage array 200 and/or disconnection of the server from the array. In response to such failure, the server 110 and storage array 200 may be initialized by a management tool, such as a script running an API or an administrator entering command via a console (not shown) of the storage system environment. Upon power up, the server (e.g., the storage connector adapter 300) may come up in one of the following states: Normal, Recovery Required or Failed.

In the Normal state, the storage connector adapter 300 shut down cleanly, such that the entries 342 of NVRAM 340 were properly flushed (processed and acknowledged), and no further action was required. In other words, all logged write requests were recorded in the I/O journal 330, their associated write data was processed and stored on the flash storage devices 325 and/or storage array 200, and (in the case of synchronous mirroring) an acknowledgment that the modified data of the mirrored request was properly stored on the storage array 200 was received and recorded by the I/O journal for every logged entry 342.

In the Recovery Required state, the storage connector adapter 300 shut down without a chance to drain (completely process) any pending write requests recorded in entries 342 of the NVRAM 340. Upon power up, the I/O journal controller 332 may determine that there are one or more "dirty" logged write request entries (via assertion and/or deassertion of the respective DB 346 and/or FB 344) in the journal 330. Accordingly, the controller 332 may replay each dirty entry by, e.g., passing the write request to the storage connector interface 350 for forwarding to the storage array 200 and/or notifying the application 124 that the write request was not successfully stored on the flash storage devices 325. Upon receiving acknowledgement that the write request was successfully processed and stored, the entry 342 of the journal 330 may be "cleaned" (i.e., the respective DB 346 and/or FB 344 deasserted and/or asserted).

In the Failed state, the current state of the storage array 200 may not be consistent with the current state of the flash storage 320. Accordingly, the management tool may re-initialize the flash storage and storage array (e.g., to empty states) or request that the storage connector adapter 300 trust either the current state of the flash storage 320 or the current state of the storage array 200. In the event of the latter, the adapter 300 and array 200 may thereafter reconcile their states and be brought on line.

Figure 4:
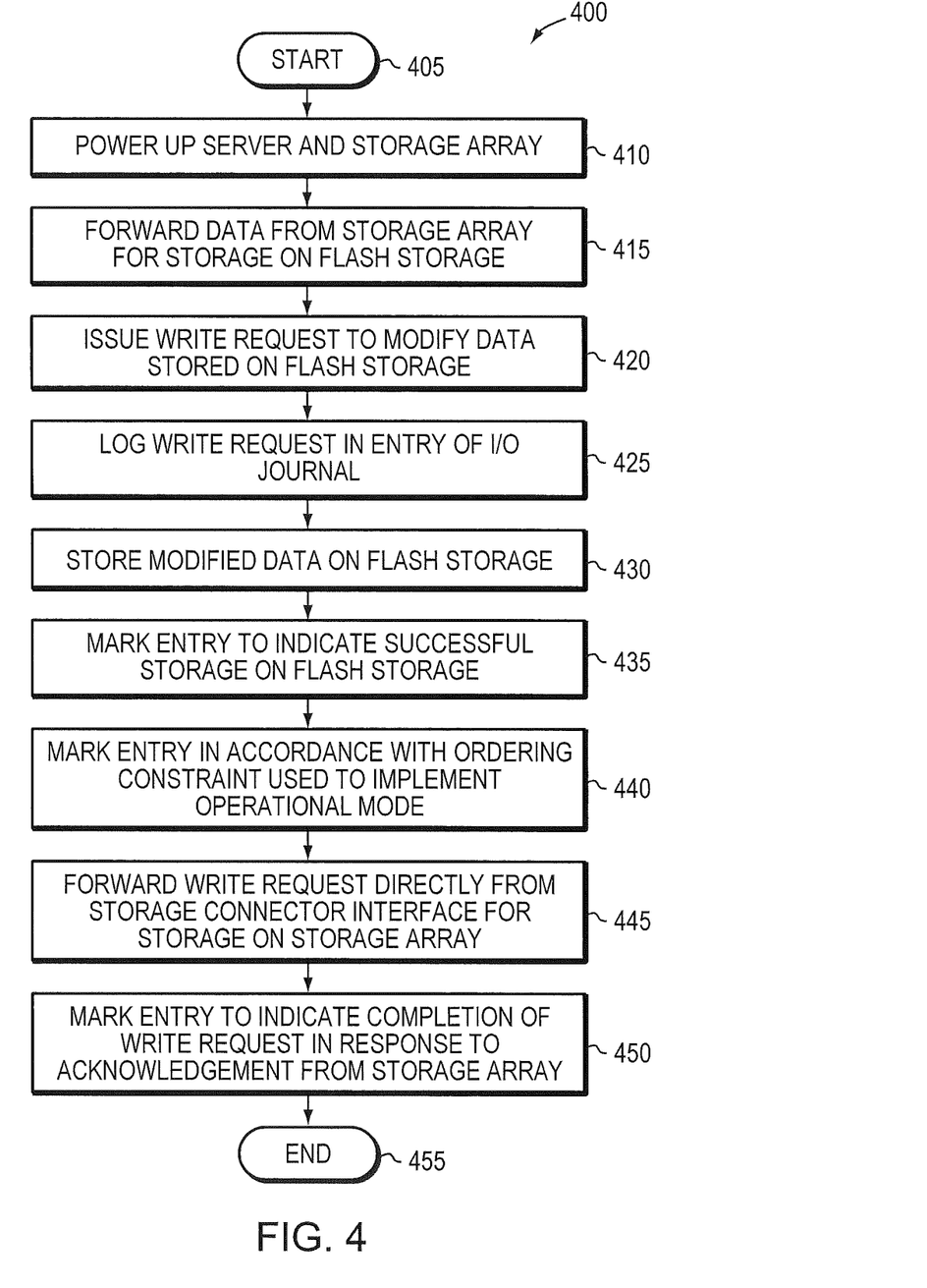
FIG. 4 illustrates a simplified procedure for performing a data exchange in accordance with one of a plurality of operational modes that deploy and synchronize the data on flash storage devices and the storage array.

FIG. 4 illustrates a simplified procedure for performing a data exchange in accordance with one of a plurality of operational modes that deploy and synchronize the data stored on flash storage devices of the server and the storage array. The procedure 400 starts at block 405 and proceeds to block 410 where the server (and storage array) power up such that, e.g., the flash storage 320 appears as addressable storage to the operating system 122. At block 415, a subset of a data set (i.e., data) is forwarded (mirrored) from the storage array for storage on the flash storage (i.e., flash storage devices) in response to, e.g., the management tool issuing a mirror request to the external storage system. At block 420, the application issues a write request to modify the data stored on the flash storage and, at block 425, the write request is logged in an entry of the I/O journal. At block 430, the modified data is stored on the flash storage and, at block 435, the logged entry is marked (via the FB) to indicate successful storage on the flash storage. At block 440, the I/O journal cooperates with the storage connector interface to mark the logged entry (e.g., as "dirty") in accordance with an ordering constraint (e.g., synchronous mirroring) used to implement the operational mode (e.g., Mode A). As noted, the write request of the logged entry is marked as "dirty" pending acknowledgement of storage on the array. At block 445, the write request is forwarded directly from the storage connector interface to the storage array (i.e., bypassing main memory and the system bus of the server) for storage on the array. Thus, the ordering constraint used to implement the operational mode synchronizes the modified data stored on the flash storage with the storage array. Upon receiving acknowledgement from the storage array, the logged entry is marked "clean" (e.g., via de-assertion of the DB) to indicate completion of the write request at the storage array (at block 450) and, at block 455, the procedure ends.

While there have been shown and described illustrative embodiments of a storage architecture having a storage connector interface configured to exchange data directly between flash storage devices on a server and a storage array of a storage system environment, it is to be understood that various other adaptations and modifications may be made within the spirit and scope of the embodiments herein. For example, the embodiments have been shown and described herein with relation to deployment and synchronization of the data (e.g., via a write request) on the flash storage devices 325 of the storage connector adapter 300 and the storage array 200. However, if the write request to the storage array fails during normal operation of the storage system environment 100, then the storage connector adapter 300 may fail all pending and future write requests that it receives (e.g., from application 124). Read requests, though, may be processed normally. Subsequently, write requests to the storage array 200 may be retried periodically and, if successful, operation of the storage system environment returns to normal.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
a storage array; and
a server connected to the storage array, the server including a main memory coupled to a storage connector adapter by a system bus, the storage connector adapter including an input/output (I/O) journal coupled to flash storage, the I/O journal configured to log one or more write operations to process data stored on the flash storage, the storage connector adapter further including a storage connector interface configured to exchange the data directly between the flash storage and the storage array so as to bypass the main memory and system bus, the storage connector interface including control logic configured to implement the data exchange in accordance with one of a plurality of operational modes that performs synchronization of the data stored on the flash storage and the storage array.

2. The system of claim 1 wherein the storage connector interface is configured to cooperate with the I/O journal to log each write operation in accordance with an ordering constraint used to implement the one operational mode to provide a consistent recovery point for the data in an event of a failure that interrupts the synchronization of the data.

3. The system of claim 1 wherein the flash storage comprises:
non-volatile, solid-state electronic devices; and
a controller configured to control access to the data stored on the non volatile, solid-state electronic devices.

4. The system of claim 3 wherein the non-volatile, solid-state electronic devices comprise flash storage devices.

5. The system of claim 1 wherein the I/O journal comprises:
non-volatile, solid-state electronic storage; and
a controller configured to control access to the non-volatile, solid-state electronic storage.

6. The system of claim 5 wherein the non-volatile, solid-state electronic storage comprises non-volatile random access memory.

7. The system of claim 1 wherein the write operation is issued by an application executing on the server.

8. The system of claim 2 wherein the I/O journal is further configured to provide a last-state retention capability that logs a current state of the data with respect to storage on the flash storage and the storage array, and that further enables processing of the logged write operation in an event of the failure.

9. The system of claim 8 wherein the storage connector interface further comprises:
a plurality of queues configured and arranged to enforce the ordering constraint used to implement the one operational mode.

10. The system of claim 9 wherein the one operational mode comprises synchronous mirroring and the ordering constraint synchronously forwards each write request to the storage array.

11. The system of claim 9 wherein the one operational mode comprises a forced ordering mode and the ordering constraint forwards each write request to the storage array, subject to the forced ordering with respect to other write requests.

12. The system of claim 9 wherein the one operational mode comprises a partial ordering mode and the ordering constraint aggregates a number of partially ordered, independent write requests during a period of time before forwarding an aggregation of the partially ordered, independent write requests to the storage array.

13. The system of claim 9 wherein the one operational mode is an out-of-order mode and the ordering constraint forwards an aggregation of write requests to the storage array concurrently without order.

14. The system of claim 13 wherein the control logic of the storage connector interface requests performance of a snapshot of the data stored on the storage array to establish the consistent recovery point.

15. The system of claim 1 wherein the storage array comprises:
a computer coupled to a plurality of disks and configured to interact with the server to enable service of the data stored on the disks in file system format and block formats with high reliability and integrity through the use of data protection and management techniques.

16. The system of claim 15 wherein the data protection and management techniques include tiered storage, persistent point-in-time read-only images of the data, or Redundant Array of Independent (or Inexpensive) Disks implementations.

17. A method comprising:
forwarding data from a storage array for storage on flash storage of a server connected to the storage array;
issuing a write request by an application executing on the server, the write request to modify the data stored on the flash storage;
storing the modified data on the flash storage; and
forwarding the write request directly from a storage connector interface of the server to the storage array so as to bypass a main memory and a system bus of the server, the write request forwarded in accordance with an ordering constraint used to implement an operational mode that synchronizes the modified data stored on the flash storage with the storage array.

18. The method of claim 17 further comprising:
marking the write request as dirty pending acknowledgement from the storage array that the modified data of the write request was properly stored on the storage array.

19. The method of claim 18 further comprising:
receiving the acknowledgement from the storage array; and
marking the write request as clean to indicate completion of the write request at the storage array.

20. A storage system environment comprising:
a storage array having a plurality of disks and configured to reliably store data on the disks through the use of data protection and management techniques; and a server connected to the storage array, the server including a main memory coupled to a storage connector adapter by a system bus, the storage connector adapter including an input/output (I/O) journal coupled to flash storage, the I/O journal configured to log one or more write operations to process selected data stored on the flash storage, the storage connector adapter further including a storage connector interface configured to exchange the selected data directly between the flash storage and the storage array so as to bypass the main memory and system bus, the storage connector interface including control logic configured to implement data exchange of the selected data in accordance with one of a plurality of operational modes that synchronize the data stored on the flash storage and the storage array, the storage connector interface further configured to cooperate with the I/O journal to log each write operation in accordance with an ordering constraint used to implement the one operational mode to provide a consistent recovery point for the selected data in an event of a failure that interrupts synchronization of the selected data.

* * * * *

UNITED STATES PATENT AND TRADEMARK OFFICE
CERTIFICATE OF CORRECTION

PATENT NO. : 9,146,684 B2  
APPLICATION NO. : 13/630664  
DATED : September 29, 2015  
INVENTOR(S) : Hubbert Smith et al.

Page 1 of 1

It is certified that error appears in the above-identified patent and that said Letters Patent is hereby corrected as shown below:

In the Claims:

Claim 15, Col. 10, lines 33-34 should read:
stored on the disks in file system format and block for-
mat with high reliability and integrity through the use of Signed and Sealed this
Sixteenth Day of February, 2016

Michelle K. Lee
*Director of the United States Patent and Trademark Office*